(12) United States Patent
Jerg

(10) Patent No.: US 7,040,490 B2
(45) Date of Patent: May 9, 2006

(54) FILTER

(75) Inventor: Helmut Jerg, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 39 days.

(21) Appl. No.: 10/603,758

(22) Filed: Jun. 25, 2003

(65) Prior Publication Data

US 2004/0079399 A1    Apr. 29, 2004

(51) Int. Cl.
  *B01D 29/07*    (2006.01)
  *B01D 39/10*    (2006.01)
(52) U.S. Cl. .................. 210/498; 210/350; 210/356
(58) Field of Classification Search ................ 210/348, 210/391, 390, 385, 395, 459, 472, 498, 346, 210/350, 356, 499, 354
See application file for complete search history.

(56) References Cited

U.S. PATENT DOCUMENTS 4,783,271 A * 11/1988 Silverwater .................. 210/742
5,554,284 A *  9/1996 Bartelt et al. ................ 210/356
5,904,163 A *  5/1999 Inoue et al. .............. 134/56 D

* cited by examiner

*Primary Examiner*—W. L. Walker
*Assistant Examiner*—Yoon-Young Kim
(74) *Attorney, Agent, or Firm*—John T. Winburn; Russell W. Warnock; Craig J. Loest

(57) ABSTRACT

A filter having filter openings, which openings vary in cross-section automatically in accordance with an inherent variable of the medium passing there through. The openings can vary in response to the heat of the medium passing through the openings. The openings can include a perforated plate screening the openings and having elements, which shift the plate relative to the openings. The elements can be springs and can include a shape memory alloy.

17 Claims, 1 Drawing Sheet

FILTER

Figure 1:
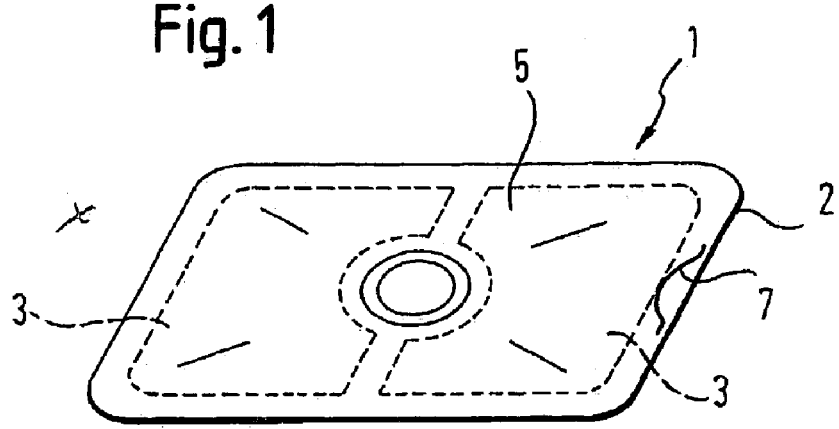

The present invention relates to a filter.

Filters are used in technology in many instances or in many processes to separate out particles contained in a medium passing through the filter. Filters are therefore used in dishwashing machines in particular to filter out food remainders contained in the rinse water. In dishwashing machines there is the particular problem of having to then remove the separated food remainders from the filter.

To solve this problem two panes with parallel longitudinal slots are provided in a self-cleaning filter, known from DE-A1-29 45 929, which are on one hand arranged offset to one another with respect to the slot direction by 90° and on the other hand are arranged to move axially relative to one another. In one position the panes rest on one another, with the intersecting longitudinal slots thus forming small square passage openings, effectively trapping particles which are larger than the passage cross-section of these small passage openings. Cleaning the filter is performed by altering the direction of flow, with at least one filter pane being shifted axially relative to the other filter pane, so that from this point on the longitudinal slots form the passage openings. The previously separated particles can be removed through these longitudinal slots which are substantially larger in cross-section, so that the filter is again clear. This type of filter design is structurally expensive. There is also the danger of jamming the mobile filter panes, and a change in the direction of flow of the medium passing through the filter is necessary to complete the cleaning procedure.

The object of the invention is to provide a filter which no longer embodies these disadvantages.

The solution to this task is achieved according to the present invention by the passage cross-section of the filter openings being varied automatically, depending on a variable inherent to the medium passing through the filter. To be able to perform cleaning in such a filter for example, it only requires the relevant variable inherent to the medium flowing through the filter. The modification in cross-section of the filter openings caused by such a change enables the filter to be rinsed free of deposited particles. The alteration to the variable inherent to the medium, e.g. temperature or flow rate, is easier to achieve than a change in the direction of flow. The invention produces a filter which obviates the abovementioned disadvantages.

A particularly advantageous embodiment of the filter is characterised in that the filter openings are screened or covered over by means, whose position relative to the filter openings can be altered under the influence of the heat of the medium passing through the filter. In this way the passage cross-section of the filter openings can be influenced, depending on the temperature of the medium flowing through the filter. Since in many technical processes a change in temperature occurs in the medium passing through the filter, cleaning of the filter is practically compulsory.

A structurally particularly simple design of the filter results from the filter being a perforated plate with perforations approximately identical to those of a filter plate, whereby the perforated plate is shifted by means of elements on the filter plate under the influence of the heat of the medium passing through the filter. The perforated plate is moved at a specific temperature of the medium passing through the filter into a position approximately level with the openings of the filter plate, resulting in enlargement of the passage cross-section.

The elements are effectively spring elements, which vary in their effective length under the influence of the heat of the medium passing through the filter. The structure is further simplified through use of automatically adjusting spring elements.

In a particularly advantageous manner the elements comprise a shape memory alloy. Such alloys change their shape or position, for example under the influence of heat. That is, when a certain temperature is reached they assume another form or take up another position and return to their original shape or position whenever the original temperature prevails. Because in many technical processes a change in temperature occurs in the medium passing through the filter, cleaning of the filter is thus practically compulsory.

A structurally particularly simple configuration of the filter results from the spring elements being supported on the one hand against a fixed edge and on the other hand against an edge of the perforated plate, effectively avoiding special, additional fastening means.

In accordance with a preferred embodiment of the invention an element is affixed to the perforated plate, by which the change in length of the element is transferred directly to the perforated plate as a change in the position of the perforated plate.

A further, structurally even simpler embodiment of the filter is characterised in that an element is assigned a reset spring arranged on an opposite side of the filter, by which fastening on the perforated plate can be dispensed with, and shifting of the perforated plate is on the one hand caused by an element and on the other hand by a reset spring made of standard material.

A filter of the abovementioned type can be used to particular advantage in a dishwashing machine. In a dishwashing machine the filter serves to filter out food remainders contained in the rinse water. This makes it necessary to rinse away deposited food remainders from the filter while running the rinsing cycle. Since the rinse water is at a different temperature during the individual rinsing procedures, e.g. prewash, cleaning, spray rinse, deep rinse, sections are formed during a temperature-dependent change to the passage cross-sections during the rinsing cycle, in which the cross-section of the filter openings is enlarged to the extent where deposited food remainders can be removed via the filter openings. This gives rise to a necessary self-cleaning operation of the filter.

Figure 2:
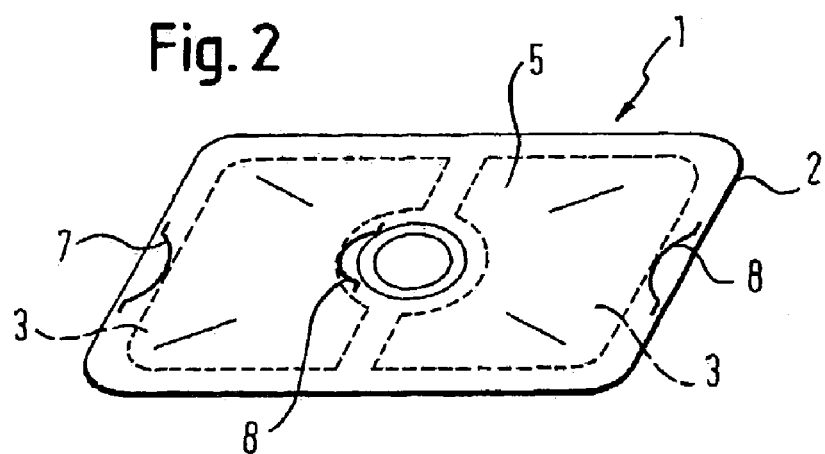
Figure 3:
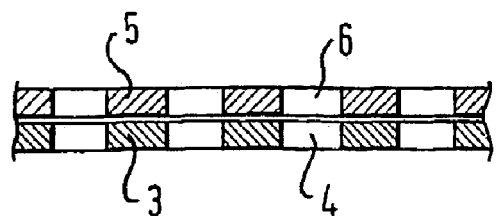
Figure 4:
Figure 5:
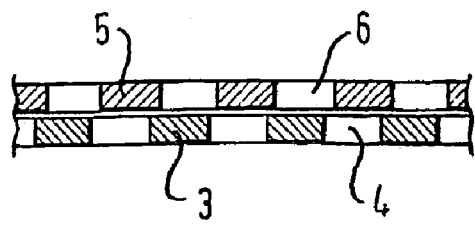
Figure 6:
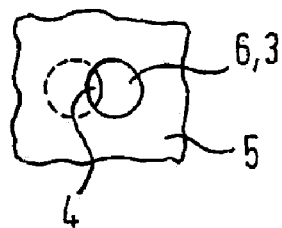

The invention will now be explained in greater detail with reference to the embodiments illustrated in the diagram, in which FIG. 1 shows plate-like filter plates, covered by a perforated plate, which is moved by only one spring element, according to a preferred embodiment of the invention, FIG. 2 shows another embodiment of the invention in which the perforated plate is moved by with two spring elements, FIG. 3 shows a partial cross-section of the filter in a state in which the filter openings are fully open, FIG. 4 shows a plan view of a filter opening of the filter in the position according to FIG. 3, FIG. 5 shows a partial cross-section of the filter in a state in which the filter openings assume a desired filter cross-section, and FIG. 6 shows a plan view of a filter opening of the filter in the position according to FIG. 5.

The embodiments are explained in the example of a filter 1 of a dishwashing machine, not illustrated in greater detail here. Identical parts have the same reference numerals.

The filter 1 has a plate-like body 2. In the illustrated embodiments this plate-like body 2 bears two filter plates 3. The plate-like body 2 is covered over by a perforated plate 5 having perforations approximately identical to those of a filter plate 3, and in the embodiment having perforations approximately identical to those of both filter plates 3.

According to the present invention the passage cross-section of the filter openings 4 can vary automatically depending on a variable inherent to the medium passing through the filter 1. This is accomplished in the illustrated embodiments by the fact that under the influence of the heat of the medium passing through the filter 1, of the washing liquid passing through the filter 1 in a dishwashing machine, in the illustrated embodiments the perforated plate b is moved by means of elements 7 on the filter plate 3, horizontally on the whole plate-like body 2, by which the filter openings 4 are screened at least partially by the perforated plate 5 or are opened by its passage openings 6.

The elements 7 shifting the perforated plate 5 are spring elements, which are altered in their effective length under the influence of the heat of the medium passing through the filter 1, brought about by the fact that their material comprises a shape memory alloy. Such alloys change their form or position for example under the influence of heat. That is, when a specific temperature is reached they assume another form or take up another position and return to their original form or position whenever the original temperature prevails. Because in many technical processes a change in temperature occurs in the medium-passing through the filter, cleaning of the filter is thus practically compulsory. Therefore at a specific temperature these spring elements 7 start to warp. This warping of the spring elements 7 leads to an increase of the effective length of the spring elements 7 and thus the perforated plate 5 is moved into a position, in which its passage openings 6 lie directly in the same position as the underlying filter openings 4 which are now fully open, as shown in FIGS. 3 and 4.

At another, for example higher temperature spring elements 7 take up a position, in which they practically shorten the effective length of the spring elements 7, by which the perforated plate 5 is moved into a position, in which its passage openings 6 partially cover the underlying filter openings 4, as shown in FIGS. 5 and 6. Only narrow slots therefore remain as passage cross-sections, as best seen in FIG. 6. Since these slots are very narrow, ca. 0.2 mm, only correspondingly small particles contained in the medium can pass through these slots. In this case the filter 1 has a high-filter effect, that is, many particles are deposited. If the abovedescribed shift of the perforated plate 5 occurs as a result of a change in temperature, the deposited particles are removed through the enlarged passage cross-sections and the filter 1 is again clear.

Common to both illustrated embodiments is the fact that the spring elements 7 are supported on the one hand against a fixed edge, in the illustrated embodiments against an edge of the plate-like body 2, and on the other hand against an edge of the perforated plate 5, effectively dispensing with special, additional fastening means.

According to the preferred embodiment illustrated in FIG. 1 only a spring element 7 is used which is affixed to the perforated plate 5, by which any change in the effective length of the spring element 7 is transferred directly to the perforated plate 5 as a change of position of the perforated plate 5.

According to the other embodiment illustrated in FIG. 2 a spring element 7 is assigned a reset spring 8 arranged on opposite sides of the filter 1, which is made of customary spring steel, by which the abovedescribed fastening on the perforated plate 5 can be dispensed with. Shifting the perforated plate 5 is caused on the one hand by the spring element 7 and on the other hand by the reset spring 8, i. e. the spring element 7 moves the perforated plate 5 into the position as in FIGS. 3 and 4 and the reset spring 8 moves the perforated plate 5 into the position shown in FIGS. 5 and 6. In FIG. 2 alternative arrangements are indicated for the reset spring 8, either on an edge of a central passage of the plate-like body 2 or on an outer edge of the plate-like body 2.

A filter 1 of the abovedescribed type can be used to particular advantage in a dishwashing machine not described in greater detail here. In a dishwashing machine the filter 1 serves to filter out food remainders left in the rinse water. This makes it necessary for deposited food remainders to be rinsed off the filter 1 from time to time during the rinsing cycle. As the rinse water is at a different temperature during the individual rinse procedures, e.g. prewash, wash, spray rinse, deep rinse, sections are formed during a temperature-dependent change to the passage cross-sections during the rinsing cycle, in which the cross-section of the filter openings is enlarged to the extent where deposited food remainders can be removed via the filter openings 4. This gives rise to a necessary self-cleaning operation of the filter 1.

The invention provides a filter which dispenses with the drawbacks of the prior art described at the outset.

What is claimed is:

1. A filter for a medium passing therethrough, comprising:
a filter body including a plurality of filter openings;
said filter openings each having a passage cross-section; and
said filter opening passage cross-sections vary automatically in response to a variable inherent in the medium passing therethrough, said filter openings being substantially screened or covered over by means whose position relative to said filter openings varies under the influence of the heat of said medium passing therethrough and said means including a perforated plate with openings somewhat longer than openings formed in a filter plate and said perforated plate is shifted under the influence of the heat of said medium passing therethrough by means of at least one element acting on said filter plate.

2. The filter according to claim 1, including said element is a spring element which varies in the effective length of said spring element under the influence of the heat of said medium passing through said filter openings.

3. The filter according to claim 2, including said spring element formed from a shape memory alloy.

4. The filter according to claim 2, including said spring element supported on a first side by a fixed edge of said filter body and on an opposite side against an edge of said perforated plate.

5. The filter according to claim 4, including at least one spring element is affixed to said perforated plate.

6. The filter according to claim 4, including at least one reset spring opposing said spring element on an opposite side of said perforated plate.

7. A dishwashing machine including a filter for a medium passing therethrough, comprising:
a filter body including a plurality of filter openings;
said filter openings each having a passage cross-section; and
means for varying said filter opening passage cross-sections automatically in response to a variable inherent in the medium passing therethrough, said filter openings being substantially screened or covered over by means whose position relative to said filter openings varies under the influence of the heat of said medium passing therethrough and said means including a perforated plate with openings somewhat longer than openings formed in a filter plate and said perforated plate is shifted under the influence of the heat of said medium passing therethrough by means of at least one element acting on said filter plate.

8. The dishwashing machine according to claim 7, including said element is a spring element which varies in the effective length of said spring element under the influence of the heat of said medium passing through said filter openings.

9. The dishwashing machine according to claim 8, including said spring element formed from a shape memory alloy.

10. The dishwashing machine according to claim 8, including said spring element supported on a first side by a fixed edge of said filter body and on an opposite side against an edge of said perforated plate.

11. The dishwashing machine according to claim 10, including at least one spring element is affixed to said perforated plate.

12. The dishwashing machine according to claim 10, including at least one reset spring opposing said spring element on an opposite side of said perforated plate.

13. to "A dishwashing machine including a filter for a medium passing therethrough, comprising: a filter body including a plurality of filter openings; said filter openings each having a passage cross-section; and means for varying said filter opening passage cross-sections automatically in response to a variable inherent in the medium passing therethrough wherein said means includes a perforated plate with openings, said perforated plate being shiftable relative to said filter openings between a first position and a second position such that, in said first position, said openings of said perforated plate are at offset from said filter openings such that said perforated plate substantially screens or covers over said filter openings and, in said second position, said openings of said perforated plate are at a lesser offset to said filter openings than in said first position such that said perforated plate does not screen or cover over said filter openings to the same extent as in said first position, and at least one element acting on said perforated plate to shift said perforated plate under the influence of a change of temperature of said medium passing therethrough between said first position and said second position.

14. A filter for a medium passing therethrough, comprising:
a filter body including a plurality of filter openings;
said filter openings each having a passage cross-section; and
means for varying said filter opening passage cross-sections automatically in response to a variable inherent in the medium passing therethrough, said means for varying said filter opening passage cross-sections including:
a perforated plate with openings, said perforated plate being shiftable relative to said filter openings between a first position and a second position such that, in said first position, said openings of said perforated plate are at offset from said filter openings such that said perforated plate substantially screens or covers over said filter openings and, in said second position, said openings of said perforated plate are at a lesser offset to said filter openings than in said first position such that said perforated plate does not screen or cover over said filter openings to the same extent as in said first position, and
at least one element acting on said perforated plate to shift said perforated plate under the influence of a change of temperature of said medium passing therethrough between said first position and said second position.

15. The filter according to claim 14, including said element is a spring element which varies in the effective length of said spring element under the influence of the heat of said medium passing through said filter openings.

16. The filter according to claim 15, including said spring element formed from a shape memory alloy.

17. The filter according to claim 15, including said spring element supported on a first side by a fixed edge of said filter body and on an opposite side against an edge of said perforated plate.

* * * * *

UNITED STATES PATENT AND TRADEMARK OFFICE
CERTIFICATE OF CORRECTION

| | | |
|---|---|---|
| PATENT NO. | : 7,040,490 B2 | Page 1 of 1 |
| APPLICATION NO. | : 10/603758 | |
| DATED | : May 9, 2006 | |
| INVENTOR(S) | : Helmut Jerg | |

It is certified that error appears in the above-identified patent and that said Letters Patent is hereby corrected as shown below:

Title Page, insert Foreign Application Priority Data

Item (30)        Dec. 29, 2000        (DE) ............................... 100 65 661.7

Title Page, insert Related U.S. Application Data
Item (63)        Continuation of Application No. PCT/EP01/14300, filed on Dec. 05, 2001.

Signed and Sealed this

Eleventh Day of December, 2007

JON W. DUDAS
*Director of the United States Patent and Trademark Office*